Nov. 27, 1923.
V. B. CARLI
1,475,792
PARACHUTE FOR AIRPLANES
Filed Feb. 21, 1922
2 Sheets-Sheet 1
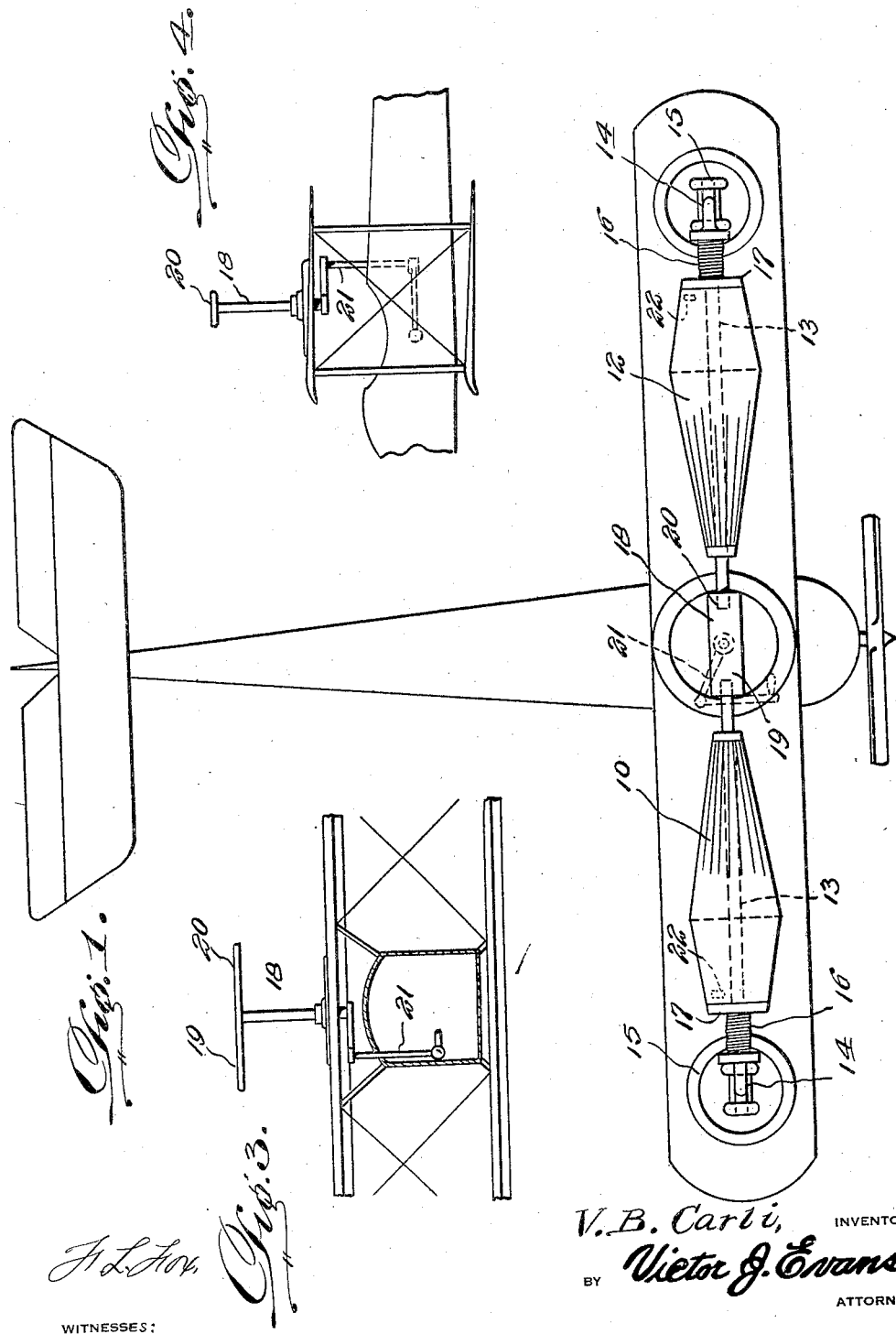

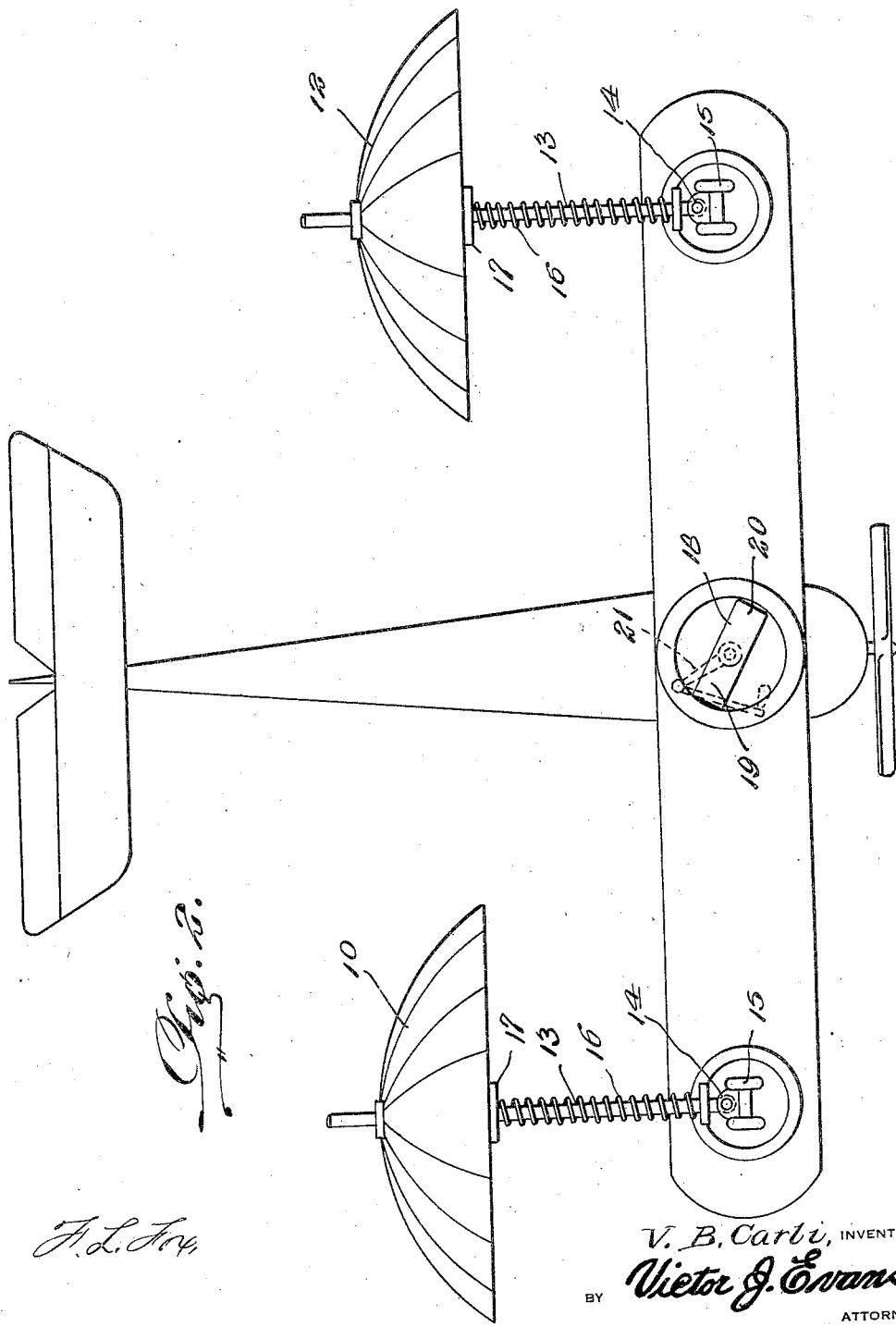

Patented Nov. 27, 1923.

1,475,792

UNITED STATES PATENT OFFICE.

VINCENZO B. CARLI, OF BOSTON, MASSACHUSETTS.

PARACHUTE FOR AIRPLANES.

Application filed February 21, 1922. Serial No. 533,299.

*To all whom it may concern:*

Be it known that I, VINCENZO B. CARLI, a citizen of the United States, residing at Boston, in the county of Suffolk and State of Massachusetts, have invented new and useful Improvements in Parachutes for Airplanes, of which the following is a specification.

This invention relates to means for mounting parachutes on airplanes, and the object is to provide mounting devices which may be instantly released by the pilot in the event of engine trouble or the like, and which when released will forcibly move the parachutes to open position.

A further object is to provide for mounting the parachutes by means of shafts or rods supported upon universal connections, the rods extending toward each other when the parachutes are not in use, and being held by retaining and releasing devices, described below and under the control of the pilot, the rods moving upwardly when released, and the parachutes opening under the action of expansion springs.

With the foregoing and other objects in view, the invention consists in the novel arrangement of elements described and claimed, it being understood that modifications may be made within the scope of the claims, without departing from the spirit of invention.

In the drawings, Figure 1 is a top plan view of an airplane with two parachutes in collapsed position; Figure 2 is a similar view with the parachutes open, but having their rods in a horizontal position; Figures 3 and 4 are detail views showing the means for retaining and releasing the approaching ends of the rods.

In carrying out the invention, I mount in a suitable position on the airplane two or more parachutes, such as 10 and 12, each parachute being carried by a rod or shaft 13 pivoted at 14 to element 15 swinging on an axis perpendicular with reference to the axis defined by the pivot 14.

A coiled spring 16 encircles rods or shafts 13 and the outer or upper end of the spring bears against element 17 of the parachutes, so that the expansion of the spring causes the opening of the device when released in the manner indicated below. Element 17 corresponds with the ferrule or runner of an umbrella.

The two parachutes illustrated, when collapsed, have their shafts turned toward each other, the ends being held by the retaining and releasing device 18 having lateral extensions 19 and 20. This device 18 is of approximately T-shape, being moved to release position by the controlling means 21, adapted for operation either by the hand or foot of the pilot. Under normal conditions the springs are held under compression by devices 22. These devices 22 project upwardly from the plane in position for engaging elements 17 when the parachutes are manually placed in collapsed position.

The particular mounting and retaining means described are considered to be unusually effective, since there are no parts or elements which may readily become displaced by accident, or which will fail to operate in an emergency.

Having thus described the invention, I claim:

1. The combination with a pair of parachutes including supporting rods, of devices for securing the lower ends of the rods to the structure of the airplane, said securing devices permitting of universal movement of the rods, the rods being movable toward each other into position in approximate alignment, and a rotatable element engaging the inner ends of both rods for retaining the parachutes inactive, and means for releasing the engaging means.

2. The combination with a pair of parachutes including supporting rods, of devices for securing the lower ends of the rods to the structure of the airplane, said securing devices permitting of universal movement of the rods, the rods being movable toward each other into position in approximate alignment, and a rotatable element engaging the inner ends of both rods for retaining the parachutes inactive, and means for releasing the engaging means, said means last named including a pedal, connections therefor, and a hand operated element associated with said pedal and connections.

3. The combination with a pair of parachutes including supporting rods, of devices for securing the lower ends of the rods to the structure of an airplane, said securing devices permitting of universal movement of the rods, springs encircling said rods and adapted to be placed under compression, for opening the parachutes when released, the rods being movable towards each other into position in approximate alignment, a rotatable element engaging the inner ends of both rods for retaining the parachutes inactive, and means for releasing the engaging means.

In testimony whereof I affix my signature.

VINCENZO B. CARLI.